United States Patent
Yang et al.

(10) Patent No.: US 9,740,910 B2
(45) Date of Patent: Aug. 22, 2017

(54) ARRAY SUBSTRATE, DRIVING METHOD AND DISPLAY DEVICE

(71) Applicants: BOE Technology Group Co., Ltd., Beijing (CN); Beijing BOE Optoelectronics Technology Co., Ltd., Beijing (CN)

(72) Inventors: Shengji Yang, Beijing (CN); Xue Dong, Beijing (CN); Haisheng Wang, Beijing (CN); Renwei Guo, Beijing (CN); Jingbo Xu, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 250 days.

(21) Appl. No.: 14/573,096

(22) Filed: Dec. 17, 2014

(65) Prior Publication Data

US 2016/0048717 A1    Feb. 18, 2016

(30) Foreign Application Priority Data

Aug. 18, 2014 (CN) .......................... 2014 1 0406687

(51) Int. Cl.
   *G06K 9/00* (2006.01)
(52) U.S. Cl.
   CPC ....... *G06K 9/0002* (2013.01); *G06K 9/00087* (2013.01)
(58) Field of Classification Search
   None
   See application file for complete search history.

(56) References Cited

U.S. PATENT DOCUMENTS

| | | | |
|---|---|---|---|
| 2003/0156744 A1* | 8/2003 | Hashimoto | G06K 9/00013 382/124 |
| 2006/0017862 A1 | 1/2006 | Song et al. | |
| 2015/0227247 A1* | 8/2015 | Wu | G06F 3/042 345/175 |

FOREIGN PATENT DOCUMENTS

| | | |
|---|---|---|
| CN | 1442824 A | 9/2003 |
| CN | 103354082 A | 10/2013 |
| CN | 104103239 A | 10/2014 |

(Continued)

OTHER PUBLICATIONS

Mar. 2, 2016—(CN)—First Office Action Appn 201410406687.9 with English Tran.

(Continued)

*Primary Examiner* — Delomia L Gilliard
(74) *Attorney, Agent, or Firm* — Banner & Witcoff, Ltd.

(57) ABSTRACT

There are disclosed in the present disclosure an array substrate, a driving method of a fingerprint recognition circuit and a display device. The array substrate comprises a substrate. There are formed on the substrate a fingerprint recognition circuit, a fingerprint signal read line, an initialization signal line, a common voltage input terminal and an output control signal line. As such, on one hand, since it is not needed a separate film layer or panel to carry the fingerprint recognition circuit, thickness of a corresponding display device can be reduced; on the other hand, the fingerprint recognition circuit and related signal lines can be formed simultaneously in the process of manufacturing the array substrate, thereby decreasing difficulty in manufacturing the corresponding display device.

20 Claims, 6 Drawing Sheets

(56) References Cited

FOREIGN PATENT DOCUMENTS

| CN | 104112120 A | 10/2014 |
|---|---|---|
| CN | 104155785 A | 11/2014 |

OTHER PUBLICATIONS

Sep. 14, 2016—(CN)—Second Office Action Appn 201410406687.9 with English Tran.

* cited by examiner

ARRAY SUBSTRATE, DRIVING METHOD AND DISPLAY DEVICE

This application claims priority to Chinese Patent Application No. 201410406687.9, filed on Aug. 18, 2014. The present application claims priority to and the benefit of the above-identified application and is incorporated herein in its entirety.

TECHNICAL FIELD

The present disclosure relates to a field of display technique, in particular to an array substrate, a driving method, and a display device.

BACKGROUND

As fingerprint recognition technology becomes increasingly mature, its application grows widespread. In display screens of some consumer electronic products (such as a mobile phone, a PDA and the like), it is started to introduce a fingerprint recognition function. In the prior art, in general, a display screen having a function of fingerprint recognition is formed by directly attaching a layer of panel or film that comprises fingerprint recognition circuit to the display panel. However, such design may on one hand render an increase of thickness of the display screen, and on the other hand needs an independent process to manufacture a corresponding fingerprint recognition panel or film layer.

SUMMARY

The present disclosure is directed to providing a new-type display device to realize fingerprint recognizing function on the premise of not increasing thickness and to be manufactured possibly through a simple process.

In order to solve the above technical problem, the present disclosure provides an array substrate comprising a substrate. There are formed on the substrate a plurality of fingerprint recognition circuits for recognizing fingerprint, a fingerprint signal read line, an initialization signal line, a common voltage input terminal and an output control signal line; the fingerprint recognition circuit comprises an initialization unit, a fingerprint recognition unit and an output control unit, wherein the initialization unit is connected to the fingerprint recognition unit and configured to initialize the fingerprint recognition unit under control of the initialization signal line; the fingerprint recognition unit is connected to the common voltage input terminal and is configured to recognize fingerprint in a corresponding area and generate a recognition signal; and the output control unit is connected to the fingerprint recognition unit, the output control signal line and the fingerprint signal read line and configured to output the recognition signal generated by the fingerprint recognition unit to the finger signal read line under control of the output control signal line.

Further, the initialization unit in particular comprises a first transistor whose first terminal is connected to the common voltage input terminal, second terminal is connected to a voltage input terminal of the fingerprint recognition unit, and control terminal is connected to the initialization signal line.

Further, the output control unit comprises a second transistor whose first terminal is connected to an output end of the fingerprint recognition unit, second terminal is connected to the fingerprint signal read line, and control terminal is connected to the output control signal line.

Further, the fingerprint recognition unit comprises a reference capacitor, a sensing electrode and a third transistor, wherein the reference capacitor has a first terminal connected to a control terminal of the third transistor and is connected to the second terminal of the first transistor as a voltage input terminal of the fingerprint recognition unit; the sensing electrode is connected to the first terminal of the reference capacitor; and the third transistor has a first terminal connected to the common voltage input terminal and a second terminal is connected to the first terminal of the second transistor as the output end of the fingerprint recognition unit.

Further, the respective fingerprint recognition circuits are located in non-display area of pixel units of the array substrate.

Further, the fingerprint recognition circuit is formed in a pixel unit of per X*Y pixel units, wherein X, Y≥2.

Further, the initialization signal line connected to a fingerprint recognition circuit is a gate scanning signal line of a previous stage of two gate scanning signal lines of the previous and next stages adjacent to the fingerprint recognition circuit, and the output control signal line is the gate scanning signal line of the next stage of the two gate scanning signal lines adjacent to the fingerprint recognition circuit.

Further, a direction of the fingerprint signal read line is vertical to the gate scanning signal line.

The present disclosure further provides a driving method of a fingerprint recognition circuit, comprising: an initialization stage, in which a scanning signal is applied to an initialization signal line to control an initialization unit to initialize a fingerprint recognition unit; and a recognition stage, in which a scanning signal is applied to an output control signal line to control an output control unit to output a recognition signal generated by the fingerprint recognition unit to a fingerprint signal read line.

The present disclosure further provides a display device comprising any one of the array substrate.

The array substrate provided in the present disclosure is integrated with the fingerprint recognition circuit for recognizing fingerprint and related signal lines. As such, on one hand, since it is not needed a separate film layer or panel to carry the fingerprint recognition circuit, thickness of a corresponding display device can be reduced; on the other hand, the fingerprint recognition circuit and related signal lines can be formed simultaneously in the process of manufacturing the array substrate, thereby decreasing difficulty in manufacturing the corresponding display device.

DETAILED DESCRIPTION

Figure 1:
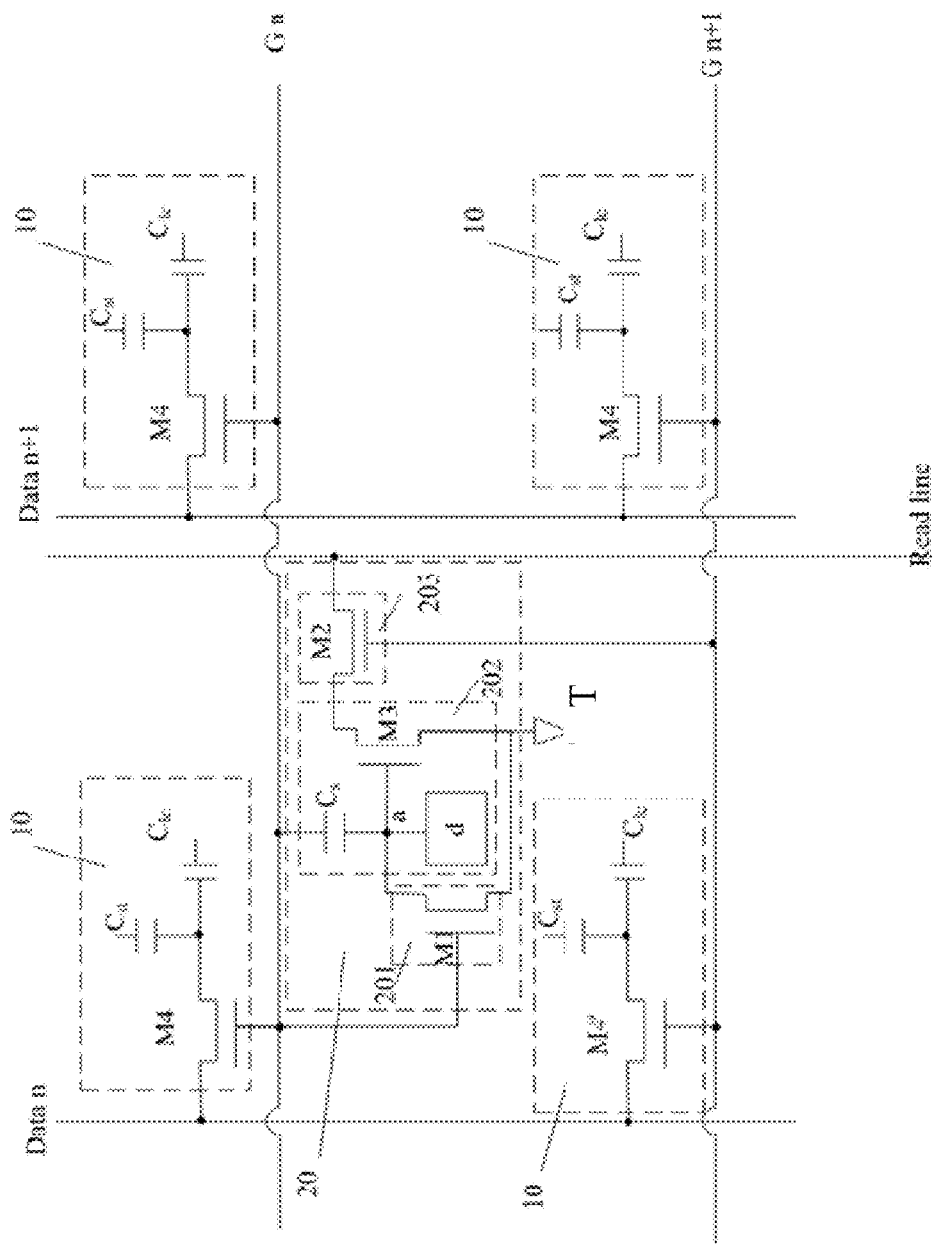
FIG. 1 is a schematic diagram of structures of a pixel circuit and a fingerprint recognition circuit in an array substrate provided by the present disclosure.

Specific implementations of the present disclosure will be further described in detail in combination with accompanying drawings and embodiments. Following embodiments are used for specifying the present disclosure, but not used for limiting the scope of the present disclosure.

Embodiments of the present disclosure provide an array substrate comprising a substrate. There are formed on the substrate a plurality of fingerprint recognition circuits for recognizing fingerprint, a fingerprint signal read line, an initialization signal line, a common voltage input terminal and an output control signal line; each of the plurality of fingerprint recognition circuits comprises an initialization unit, a fingerprint recognition unit and an output control unit, wherein the initialization unit is connected to the fingerprint recognition unit, the common voltage input terminal and a corresponding initialization signal line, and configured to initialize the fingerprint recognition unit by using voltage provided at the common voltage input terminal under control of the initialization signal line; the fingerprint recognition unit is connected to the common voltage input terminal and is configured to recognize fingerprint in a corresponding area by using the operation voltage provided at the common voltage input terminal and generate a recognition signal; and the output control unit is connected to the fingerprint recognition unit, the output control signal line and the fingerprint signal read line, and configured to output the recognition signal generated by the fingerprint recognition unit to the finger signal read line under control of the output control signal line.

There are integrated in the array substrate provided by the present disclosure the fingerprint recognition circuit for recognizing fingerprint and related signal lines. As such, on one hand, since it is not needed a separate layer of film or panel to carry the fingerprint recognition circuit, thickness of a corresponding display device can be reduced; on the other hand, the fingerprint recognition circuit and related signal lines can be formed simultaneously in the process of manufacturing the array substrate, thereby decreasing difficulty in manufacturing the corresponding display device.

In practical application, according to the present disclosure, the plurality of fingerprint recognition circuits may either be arranged in specific areas for non-display on the array substrate or arranged in a display area on the array substrate. Either of the two ways will influence implementation of the present disclosure, and corresponding technical solutions shall fall into the protection scope of the present disclosure. In an exemplary embodiment of the present disclosure, the fingerprint recognition circuit is arranged in the display area on the array substrate.

Further, in the exemplary embodiment of the present disclosure, the fingerprint recognition circuit is arranged in pixel units of the array substrate, and only one fingerprint recognition circuit is arranged in each pixel unit that comprises the fingerprint recognition circuit.

In a specific implementation, in order to avoid the fingerprint recognition circuit arranged in the pixel unit from influencing aperture ratio, the whole or part of the fingerprint recognition circuit can further be arranged in the non-display area of the pixel unit.

Further, the pixel unit comprising the fingerprint recognition circuit is distributed periodically in the array substrate. That is, only one pixel unit of a plurality of adjacent pixel units comprises the above fingerprint recognition circuit. A more exemplary mode is as follows: one fingerprint recognition circuit is arranged in one pixel unit of per X*Y pixel units, that is, the fingerprint recognition circuit is formed in one pixel unit of per X rows and Y columns of pixel units, wherein X and Y are natural integers greater than 2.

In practical application, a width of a texture of fingerprint is far greater than a width of a pixel unit, and thus an appropriate reduction of density of the fingerprint recognition circuit will not influence accuracy of fingerprint recognition. On such a basis, in the exemplary implementation of the present disclosure, in order to reduce manufacturing cost and complexity of the array substrate, the fingerprint recognition circuits are made to be distributed periodically in the array substrate, instead of setting one fingerprint recognition circuit in each pixel unit. Of course, in order to ensure correct recognition of fingerprint, X and Y herein should not be a too large value.

Those skilled in the art can understood that the technical solutions provided in the present disclosure can also be implemented by setting one fingerprint recognition circuit in each pixel unit on the array substrate or forming a plurality of fingerprint recognition circuits only in a specific area on the array substrate. The exemplary implementation of the present disclosure cannot be understood as a limitation to the protection scope of the present disclosure.

The structure of the fingerprint recognition circuit arranged in the pixel unit of the present disclosure will be described in combination with FIG. 1. Since in the array substrate, a pixel circuit is arranged also in the pixel unit, the present disclosure is described by combining simultaneously the fingerprint recognition circuit and the pixel circuit.

As shown in FIG. 1, a pixel circuit 10 and a fingerprint recognition circuit 20 are set in a pixel unit that is limited by the n-th row of gate scanning signal line (herein after referred to as a gate line) $G_n$ and the (n+1)-th row of gate line $G_{n+1}$ as well as the n-th column of data line $Data_n$ and the (n+1)-th column of data line $Data_{n+1}$, and at the same time the pixel circuit is also set in other pixel units, wherein the fingerprint recognition circuit 20 can comprise an initialization unit 201, a fingerprint recognition unit 202 and an output control unit 203; wherein the initialization unit 201 is connected to the fingerprint recognition unit 202 and connected to the gate line $G_n$ and a common voltage input terminal T (the triangular pattern as shown in FIG. 1), and is configured to initialize the fingerprint recognition unit 202 by using a common voltage at the common voltage input terminal T (given that the common voltage is $V_{com}$) under control the gate lime $G_n$; the fingerprint recognition unit 202 is connected to the common voltage input terminal T, and is configured to recognize fingerprint in the pixel unit by using a driving voltage provided at the common voltage input terminal T and generate a corresponding recognition signal; and the output control unit 203 is connected to the fingerprint recognition unit 202 and a corresponding recognition signal read line Read Line, and connected to the gate line $G_{n+1}$, and is configured to output the recognition signal generated by the fingerprint recognition unit 202 to the connected recognition signal read line Read Line under control of the gate line $G_{n+1}$.

In the exemplary embodiment of the present disclosure, the gate lines $G_n$ and $G_{n+1}$ are used as control lines of the initialization unit and the output control unit, so that integration of the array substrate can be further increased to avoid manufacturing dedicatedly on the array substrate the initialization signal line for controlling the initialization unit and the output control signal line for controlling the output control unit. Of course, the technical solution of the present disclosure can be implemented by manufacturing dedicatedly on the array substrate the initialization signal line and the output control signal line for controlling the output control unit. The exemplary embodiment of the present disclosure cannot be understood as a limitation to the protection scope of the present disclosure.

In the embodiment of the present disclosure, initializing the fingerprint recognition unit by using the voltage at the common voltage input terminal and providing the operation voltage to the fingerprint recognition circuit can avoid from specifically manufacturing corresponding initialization electrode and driving electrode. However, in practical application, the technical solution provided in the present disclosure can also be implemented by those skilled in the art through specially manufacturing the initialization electrode and the driving electrode. Such technical solution obtained from a simple replacement of the present disclosure shall be fallen into the protection scope of the present disclosure.

Further, as shown in FIG. 1, the initialization unit 201 particularly comprises a first transistor M1 whose first terminal is connected to the common voltage input terminal T, second terminal is connected to a voltage input terminal a of the fingerprint recognition unit 202, and control terminal is connected to the gate line $G_n$. When a pulse signal is applied to the gate line $G_n$, M1 is turned on, and voltage at the voltage input terminal a of the fingerprint recognition unit 202 is set as the voltage $V_{com}$ of the common voltage input terminal T.

Further, as shown in FIG. 1, the output unit 203 comprises a second transistor M2 whose first terminal is connected to an output end of the fingerprint recognition unit 202, second terminal is connected to a corresponding recognition signal read line Read Line, and control terminal is connected to the next row of gate line $G_{n+1}$. When a pulse signal is applied to the gate line $G_{n+1}$, M2 is turned on, and the recognition signal generated by the fingerprint recognition unit 202 is output to the recognition signal read line Read Line. In the specific implementation, since both the first transistor M1 and the second transistor M2 are turned on when the pulse signal is applied to the gate line, the first transistor M1 and the second transistor M2 have the same type of channel, for example, N-type or P-type.

Further, as shown in FIG. 1, the fingerprint recognition unit 202 comprises a reference capacitor $C_s$, a sensing electrode d and a third transistor M3, wherein the reference capacitor $C_s$ has a first terminal connected to a control terminal of the third transistor M3 and connected to the second terminal of the first transistor M1 through the voltage input terminal a of the fingerprint recognition unit 202; the sensing electrode d is connected to the first terminal of the reference capacitor $C_s$; and the third transistor M3 has a first terminal connected to the common voltage input terminal T and a second terminal connected to the first terminal of the second transistor M2 through the output end of the fingerprint recognition unit 202.

In practical application, since the first terminal of the reference capacitor $C_s$ is connected to the second terminal of the first transistor M1, after the first transistor M1 is turned on, the common voltage input terminal T and the first terminal of the reference capacitor $C_s$ are connected to charge the reference capacitor $C_s$ so that the reference capacitor $C_s$ stores certain amount of charges, so as to maintain the voltage at the control terminal of the third transistor M3; in addition, in practical application, the third transistor M3 per se may generate a parasitic capacitor $C_t$, and the parasitic capacitor $C_t$ will also store a part of charges when being charged; since the first terminal of the reference capacitor $C_s$ is further connected to the sensing electrode d, a coupling capacitor $C_f$ is formed between fingers and the sensing electrode d when the fingers touch an area corresponding to the sensing electrode d. Then, in the case that the first transistor M1 is turned off, the formed coupling capacitor $C_f$ will take away a part of charges from the reference capacitor $C_s$ and the parasitic capacitor $C_t$, so as to pull down the voltage at end a, i.e., the voltage at the control terminal of the third transistor M3. Since the distance between the concave portion of the fingerprint and the sensing electrode d and the distance between the convex portion of the fingerprint and the sensing electrode d are different when the fingers touch the screen, the capacitance of the formed coupling capacitor $C_f$ is also different. Correspondingly, amplitudes of pulling down the voltage at the end a are also different (the larger the ratio of $C_f$ to $(C_s+C_t)$ is, the greater the capability for taking away the charges is, and thus the greater the amplitude of pulling down the voltage at end a is); as such, by selecting a third transistor M3 having an appropriate on-threshold and a reference capacitor Cs, the on-state of the third transistor M3 when the concave portion of the fingerprint touches the pixel unit corresponding to the fingerprint recognition circuit differs from the on-state of the third transistor M3 when the convex portion of the fingerprint touches the pixel unit corresponding to the fingerprint recognition circuit.

In FIG. 1, the second terminal of the reference capacitor $C_s$ is also connected to the gate line $G_n$, but it should be noted that those skilled in the art can understand according to the operation principle of the fingerprint recognition unit that in practical application, the second terminal of the reference capacitor Cs is not necessarily connected to the gate line $G_n$. Either connecting the second terminal of the reference capacitor $C_s$ to the ground or null or connecting it to other ends (except the common electrode end T) will not affect charging/discharging at the first terminal of the reference capacitor $C_s$, and thus will not affect the implementation of the present disclosure.

Further, respective pixel circuit 10 comprises a fourth transistor M4 (in order to distinguish from the fourth transistor M4 in other pixel units, the fourth transistor in the pixel circuit 10 arranged in the pixel unit limited by the n-th row of gate line $G_n$, the (n+1)-th row of gate line Gn+1 and the n-th column of data line $Data_n$ and the (n+1)-th column of data line $Data_{n+1}$ is marked as M4', and the fourth transistor M4 in other pixel circuits 10 is marked as M4), a storage capacitor $C_{st}$, and a liquid crystal deflection capacitor $C_{Ic}$;

Herein, a control terminal of the fourth transistor M4' is connected to the gate line $G_{n+1}$, a first terminal thereof is connected to the corresponding data line $Data_n$, and a second terminal thereof is connected to a first terminal of the storage capacitor $C_{st}$ and a first terminal of the liquid crystal deflection capacitor $C_{Ic}$.

Further, respective transistors in the present disclosure are N-channel type thin film field effect transistors. At this time, the first terminal of respective transistors refers to a drain of the thin film field effect transistor, and the second terminal thereof refers to a source of the thin film field effect transistor. Adopting transistors of the same type is able to realize unity of the process flow, so as to enhance yield rate of products. Of course, in practical application, the above respective thin film field effect transistors may also be P-type. Correspondingly, at this time, the first terminal of the respective transistors refers to the source of the thin film field effect transistor and the second terminal thereof refers to the drain of the thin film field effect transistor. Of course, for transistors whose source and drain can be exchanged, the types of the first terminal and the second terminal are not limited.

Exemplarily, a fingerprint recognition circuit 20 is formed when manufacturing the pixel circuit 10.

In the embodiments of the present disclosure, elements relating to the pixel circuit 10 and the fingerprint recognition circuit 20 are basically the same, and thus correspondingly they can be made by the same manufacturing process. In this way, the process for manufacturing the arrays substrate can be further simplified.

Optionally, the direction of the fingerprint signal read line is vertical to that of the gate scanning signal line. This has the advantage that each column of pixel units comprising the fingerprint recognition circuit only needs to use one fingerprint signal read line, and after the recognition signal is read, such fingerprint signal read line can determine the pixel column at which the fingerprint recognition circuit that generates the recognition signal is located, and determine the location of generating the recognition signal by combining with the gate line to which the scanning signal line is applied currently. Of course, in practical application, the direction of the fingerprint signal read line may also be other directions, for example, in parallel to the gate scanning signal line. At this time, for one column of fingerprint recognition circuit, it is needed to set a plurality of a plurality of fingerprint signal read lines.

The present disclosure further provides a driving method of the fingerprint recognition circuit. The driving method comprises an initialization stage and a recognition stage, wherein in the initialization stage, a scanning signal is applied to an initialization signal line to control an initialization unit to initialize the fingerprint recognition unit; in the recognition stage, a scanning signal is applied to the output control signal line to control an output control unit to output the recognition signal generated by the fingerprint recognition unit to the fingerprint signal read line.

The driving method provided by the present disclosure is described below combined with FIGS. 2 and 3 by taking the pixel unit limited by the gate lines $G_n$, $G_{n+1}$ and the data lines $Data_n$, $Data_{n+1}$ and arranged therein a pixel circuit and a fingerprint recognition circuit as an example. In order to facilitate the description, assuming that respective transistors relating to the pixel unit are N-channel type thin film field effect transistors. At this time, the pulse signal applied to the gate line shall be a high level signal (refer to FIG. 2).

Figure 2:
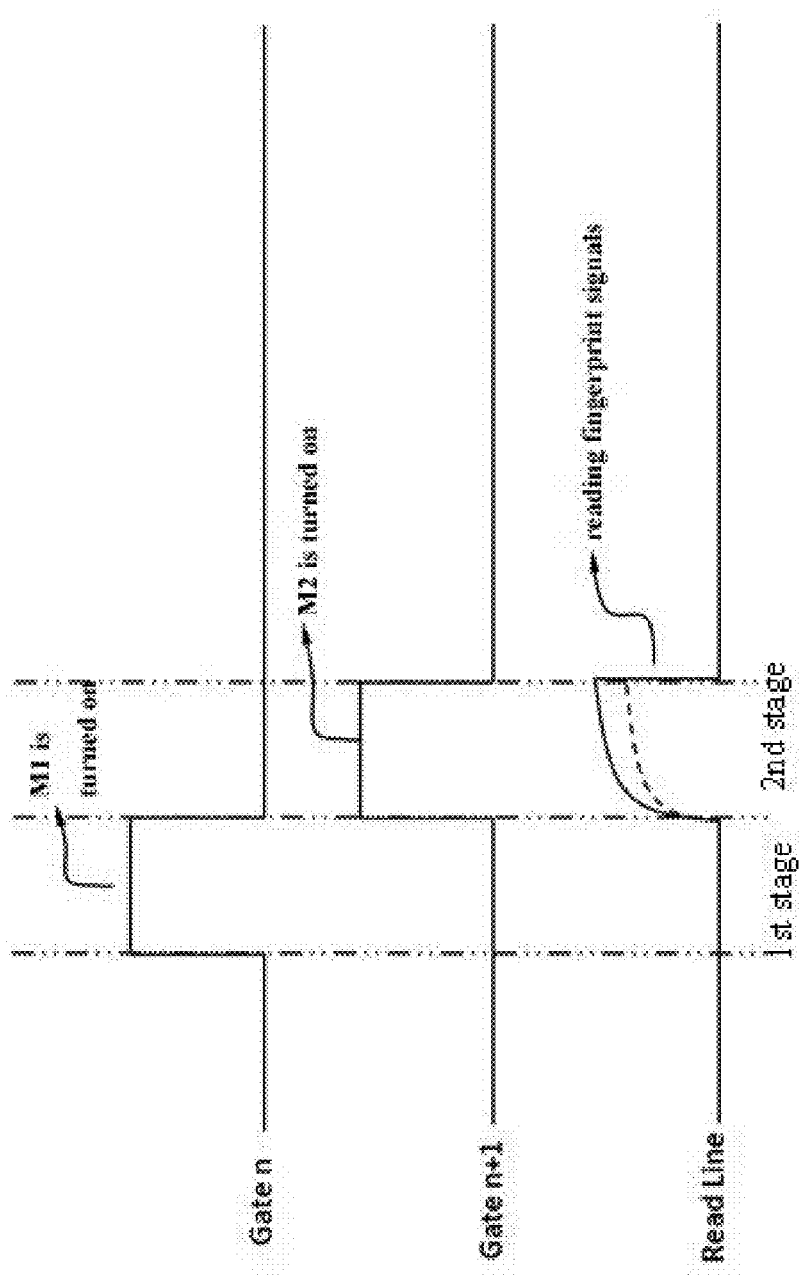
FIG. 2 is a schematic diagram of operation timing of a part of signals in an array substrate provided by the present disclosure.
Figure 3A:
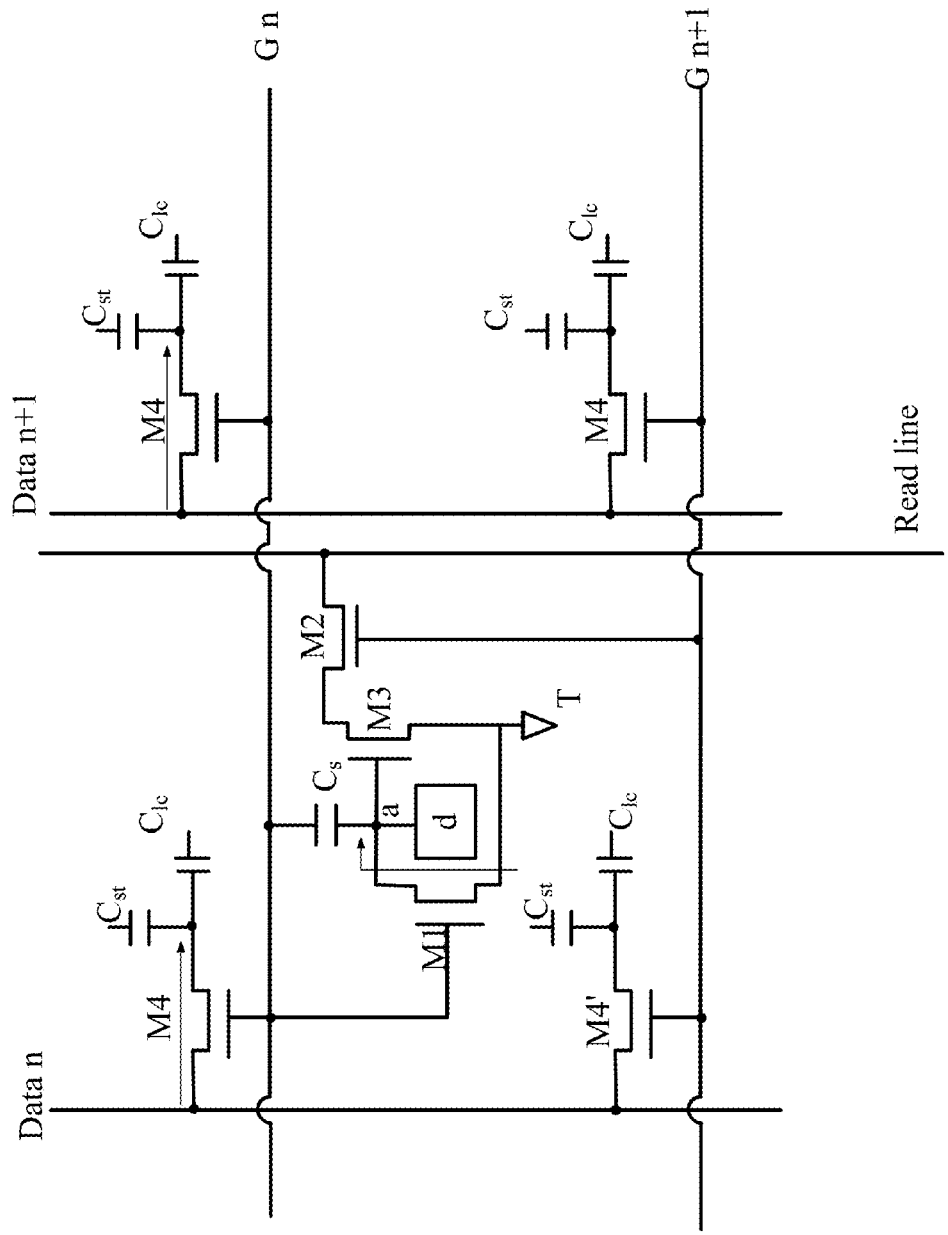
FIGS. 3a and 3b are schematic diagrams of current flowing directions and voltage values of a pixel circuit and a fingerprint recognition circuit in an array substrate provided by the present disclosure under different timings.

In an initialization stage ($1^{st}$ stage), as shown in FIG. 2, a pulse signal (i.e., a high level signal) is applied to the gate line $G_n$, and no pulse signal is applied to other gate lines (low level); as shown in FIG. 3a, in the pixel circuit of the pixel unit, the fourth transistor M4' is turned off, and the pixel circuit is in a non-operation state; in the fingerprint recognition circuit, the first transistor M1 is turned on, and the voltage $V_{com}$ at the common voltage input terminal T is written into the end a of the reference capacitor $C_s$.

Figure 3B:
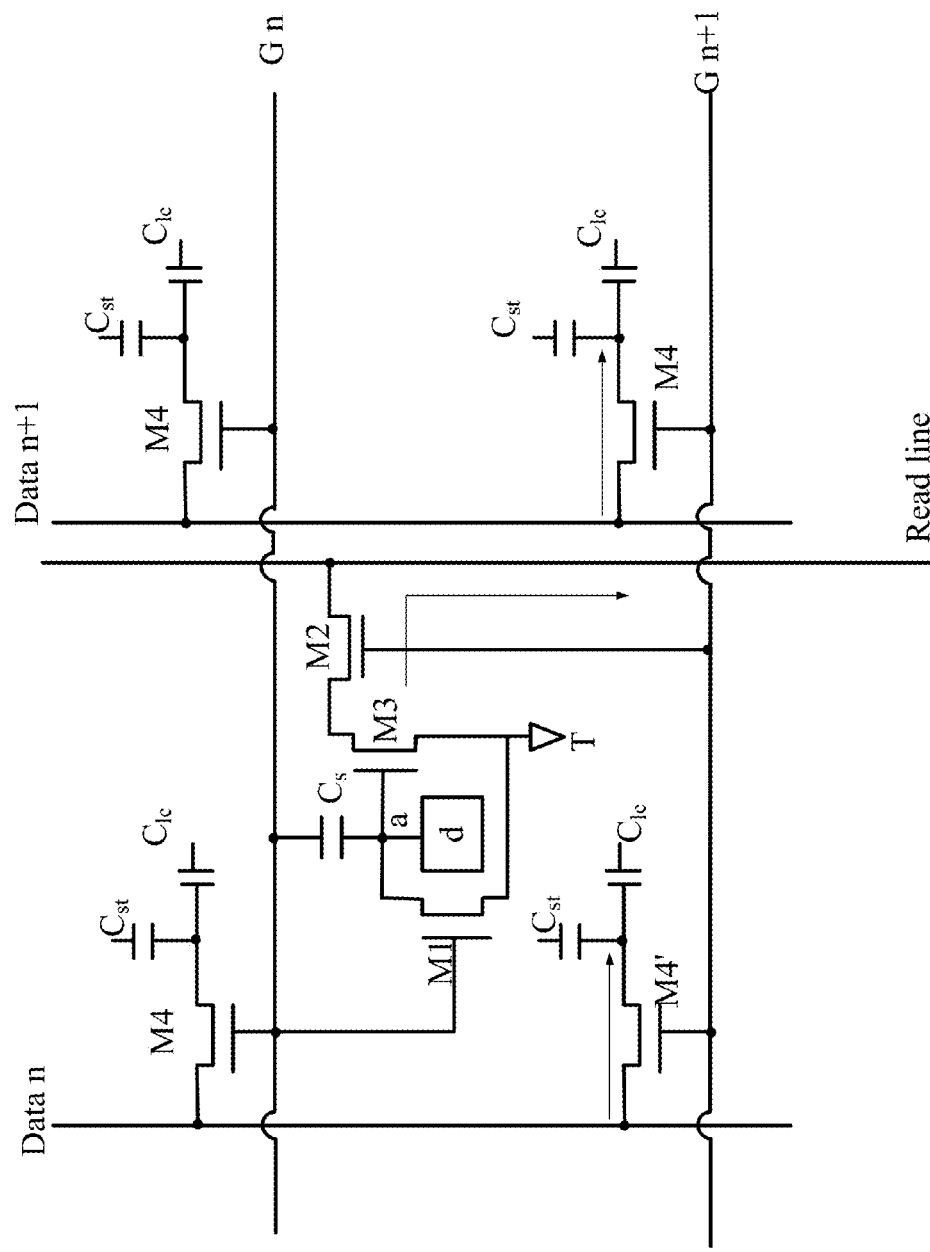

In a recognition stage ($2^{nd}$ stage), as shown in FIG. 2, a pulse signal is applied to the gate line $G_{n+1}$. At this time, as shown in FIG. 3b, in the pixel circuit, the fourth transistor M4' is turned on, and the voltage at the first terminal of the storage capacitor $C_{st}$ is set as data voltage (assuming that it is $V_{data}$); since the first terminal of the storage capacitor $C_{st}$ is connected to the first terminal (pixel electrode) of the liquid crystal deflection capacitor $C_{lc}$, it is possible to maintain the voltage at the first terminal of the liquid crystal deflection capacitor $C_{lc}$, so as to control deflection of liquid crystal modules in the corresponding area and control light emitting;

In the fingerprint recognition circuit, as shown in FIG. 3b, the second transistor M2 is turned on to output the generated recognition signal to Read line. It is not difficult to understand that since M2 is turned on only when the gate line (i.e., $G_{n+1}$) corresponding to the pixel unit of M2 is applied a high level, the signal read from the Read line must be generated by the fingerprint recognition circuit in the currently scanned row (the (n+1)-th row) of pixel units. In this way, y-coordinate of the fingerprint recognition circuit of the fingerprint recognition signal can be determined. Thus it can be seen that in the embodiment of the present disclosure the gate line acts as a read line in X-direction. The Read line per se is a read line in Y-direction and is used for reading the coordinate in X-direction.

Figure 4A:
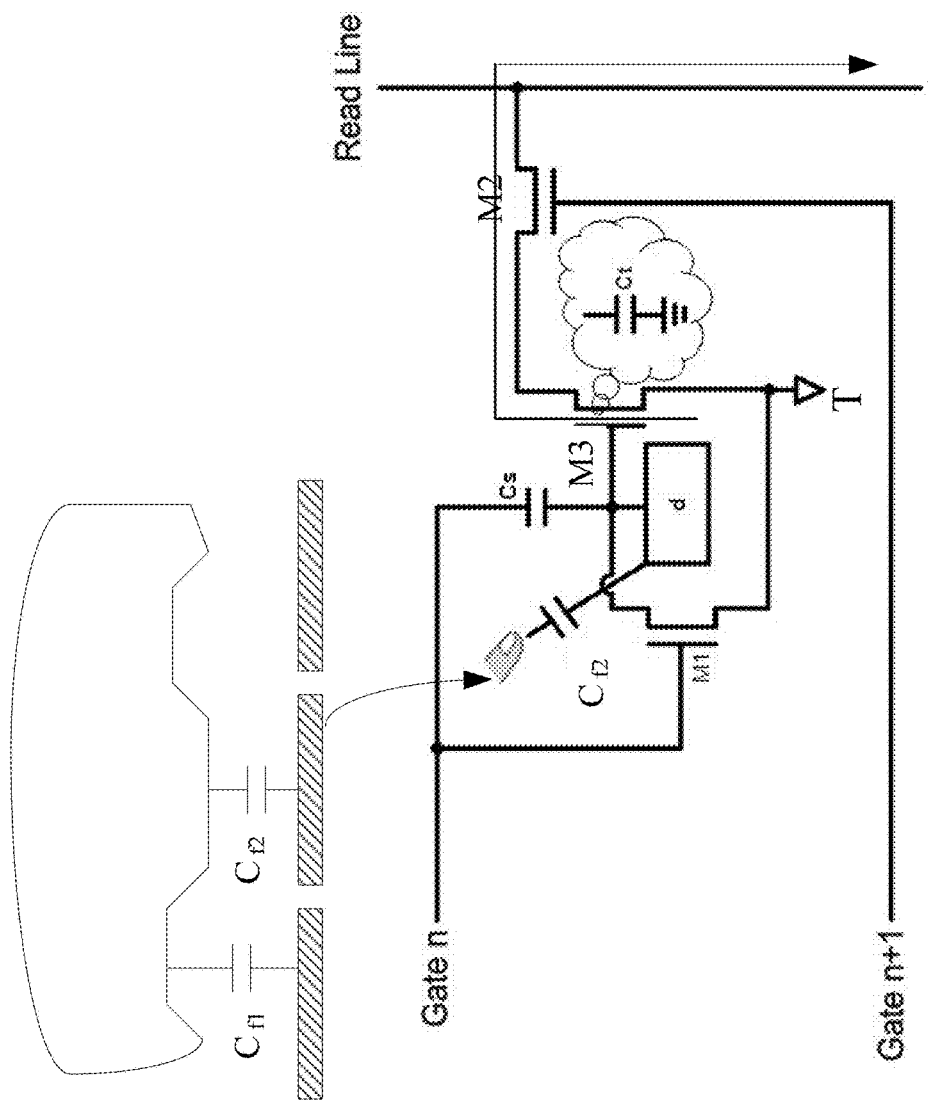
FIGS. 4a and 4b are schematic diagrams of a principle that a fingerprint recognition circuit in an array substrate provided by the present disclosure performs the fingerprint recognizing.

The operation principle of the fingerprint recognition circuit in the array substrate provided in the embodiment of the present disclosure will be described in detail in combination with FIG. 4. As shown in FIG. 4a, when corresponding position of the fingerprint recognition circuit is the concave portion of the fingerprint, the concave portion and the sensing electrode d form a capacitor $C_{f1}$. Since the concave portion has a large distance relative to the sensing electrode d, the capacitor $C_{f1}$ is relatively small. Such capacitor will not take away too many charges of $C_s$ and $C_t$, that is, it will not cause the voltage at the gate of the third transistor M3 to decrease dramatically, and the third transistor M3 will be turned on. In this regard, when the second transistor M2 is turned on, the recognition signal read by the recognition signal read line Read line is at a high level.

Figure 4B:
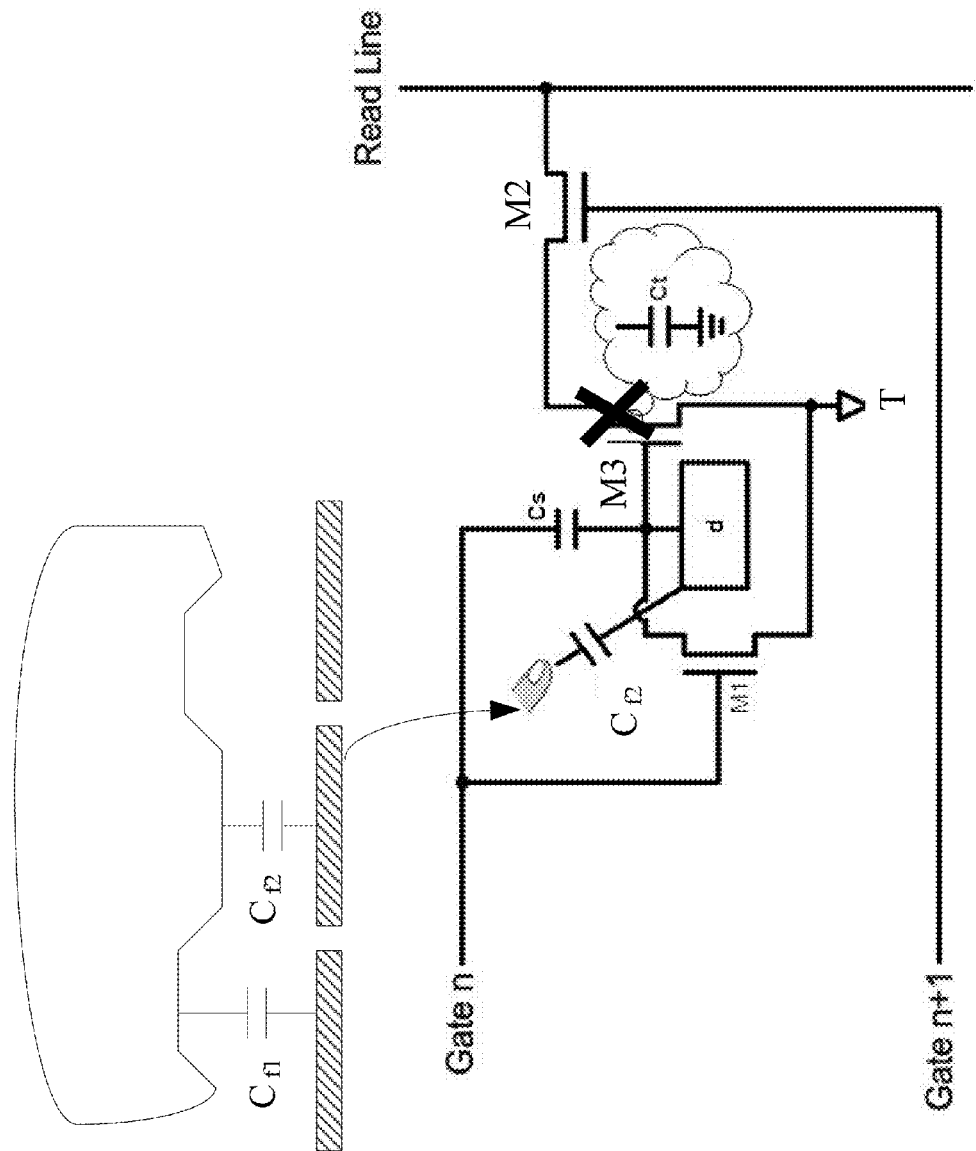

Correspondingly, as shown in FIG. 4b, when the top of the fingerprint recognition circuit is the convex portion of the fingerprint, the convex portion and the sensing electrode d form a capacitor $C_{f2}$. Since the convex portion has a small distance relative to the sensing electrode d, the capacitor $C_{f2}$ is relatively large. Such capacitor will take away charges of $C_s$ and $C_t$ massively, which causes the voltage at the gate of the driving transistor to decrease dramatically. In this regard, when the second transistor M2 is turned on, the third transistor M3 will not be turned on, and the recognition signal read by the recognition signal read line Read line is at a low level.

In the subsequent process, the recognition signal read by the recognition signal read line Read line can be amplified and input to a corresponding processor. The processor determines whether a corresponding area is the concave portion or convex portion of the fingerprint according to the level of the received recognition signal, so as to identify the fingerprint.

It should be noted that although the driving method of the fingerprint recognition circuit provided in the present disclosure is described only by the fingerprint recognition circuit provided in the embodiments of the present disclosure, in the practical application, the driving method can be further used to drive fingerprint recognition circuits of other structure types. Adopting the driving method provided by the present disclosure to drive the fingerprint recognition circuits of other structure types shall be fallen into the protection scope of the present disclosure.

Based on the same concept, the present disclosure further provides a display device comprising any one of the array substrate.

The display device herein may be any product or component having a display function, such as a liquid crystal panel, an OLED panel, an electronic paper, a mobile phone, a tablet computer, a TV set, a display, a notebook computer, a digital photo frame, a navigator and so on.

The above descriptions are just exemplary embodiments of the present disclosure. It shall be pointed out that various improvements and modifications can be made without departing from the technical principle of the present disclo-

What is claimed is:

1. An array substrate comprising a substrate on which a plurality of fingerprint recognition circuits for recognizing fingerprint, a fingerprint signal read line, an initialization signal line, a common voltage input terminal and an output control signal line are formed; the fingerprint recognition circuit comprising an initialization unit, a fingerprint recognition unit and an output control unit, wherein the initialization unit is connected to the fingerprint recognition unit and configured to initialize the fingerprint recognition unit under control of the initialization signal line;

the fingerprint recognition unit is connected to the common voltage input terminal and is configured to recognize fingerprint in a corresponding area and generate a recognition signal; and the output control unit is connected to the fingerprint recognition unit, the output control signal line and the fingerprint signal read line, and configured to output the recognition signal generated by the fingerprint recognition unit to the finger signal read line under control of the output control signal line; and wherein the initialization unit comprises a first transistor, the output control unit comprises a second transistor, and the fingerprint recognition unit comprises a reference capacitor, a sensing electrode and a third transistor.

2. The array substrate according to claim 1, wherein the first transistor has a first terminal connected to the common voltage input terminal, a second terminal connected to a voltage input terminal of the fingerprint recognition unit, and a control terminal connected to the initialization signal line.

3. The array substrate according to claim 2, wherein the second transistor has a first terminal connected to an output end of the fingerprint recognition unit, a second terminal connected to the fingerprint signal read line, and a control terminal connected to the output control signal line.

4. The array substrate according to claim 3, wherein a first end of the reference capacitor is connected to a control terminal of the third transistor and is connected to the second terminal of the first transistor as a voltage input terminal of the fingerprint recognition unit; the sensing electrode is connected to the first end of the reference capacitor; and a first terminal of the third transistor is connected to the common voltage input terminal and a second terminal is connected to the first terminal of the second transistor as the output end of the fingerprint recognition unit.

5. The array substrate according to claim 1, wherein the respective fingerprint recognition circuits are located in non-display area of pixel units of the array substrate.

6. The array substrate according to claim 5, wherein the fingerprint recognition circuit is formed in a pixel unit of per X*Y pixel units, wherein X, Y≥2.

7. The array substrate according to claim 1, wherein the initialization signal line connected to a fingerprint recognition circuit is a gate scanning signal line of previous stage of two gate scanning signal lines of the previous and next stages adjacent to the fingerprint recognition circuit, and the output control signal line is the gate scanning signal line of the next stage of the two gate scanning signal lines adjacent to the fingerprint recognition circuit.

8. The array substrate according to claim 7, wherein a direction of the fingerprint signal read line is vertical to that of the gate scanning signal line.

9. A driving method of a fingerprint recognition circuit, wherein the method comprises:

an initialization stage, in which a scanning signal is applied to an initialization signal line to control an initialization unit to initialize a fingerprint recognition unit; and a recognition stage, in which a scanning signal is applied to an output control signal line to control an output control unit to output a recognition signal generated by the fingerprint recognition unit to a fingerprint signal read line; and wherein the initialization unit comprises a first transistor, the output control unit comprises a second transistor, and the fingerprint recognition unit comprises a reference capacitor, a sensing electrode and a third transistor.

10. A display device, wherein the display device comprises the array substrate according to claim 1.

11. The array substrate according to claim 2, wherein the initialization signal line connected to a fingerprint recognition circuit is a gate scanning signal line of previous stage of two gate scanning signal lines of the previous and next stages adjacent to the fingerprint recognition circuit, and the output control signal line is the gate scanning signal line of the next stage of the two gate scanning signal lines adjacent to the fingerprint recognition circuit.

12. The array substrate according to claim 3, wherein the initialization signal line connected to a fingerprint recognition circuit is a gate scanning signal line of previous stage of two gate scanning signal lines of the previous and next stages adjacent to the fingerprint recognition circuit, and the output control signal line is the gate scanning signal line of the next stage of the two gate scanning signal lines adjacent to the fingerprint recognition circuit.

13. The array substrate according to claim 4, wherein the initialization signal line connected to a fingerprint recognition circuit is a gate scanning signal line of previous stage of two gate scanning signal lines of the previous and next stages adjacent to the fingerprint recognition circuit, and the output control signal line is the gate scanning signal line of the next stage of the two gate scanning signal lines adjacent to the fingerprint recognition circuit.

14. The array substrate according to claim 5, wherein the initialization signal line connected to a fingerprint recognition circuit is a gate scanning signal line of previous stage of two gate scanning signal lines of the previous and next stages adjacent to the fingerprint recognition circuit, and the output control signal line is the gate scanning signal line of the next stage of the two gate scanning signal lines adjacent to the fingerprint recognition circuit.

15. The array substrate according to claim 6, wherein the initialization signal line connected to a fingerprint recognition circuit is a gate scanning signal line of previous stage of two gate scanning signal lines of the previous and next stages adjacent to the fingerprint recognition circuit, and the output control signal line is the gate scanning signal line of the next stage of the two gate scanning signal lines adjacent to the fingerprint recognition circuit.

16. The display device according to claim 10, wherein the first transistor has a first terminal connected to the common voltage input terminal, a second terminal connected to a voltage input terminal of the fingerprint recognition unit, and a control terminal connected to the initialization signal line.

17. The display device according to claim 16, wherein the second transistor has a first terminal connected to an output end of the fingerprint recognition unit, a second terminal connected to the fingerprint signal read line, and a control terminal connected to the output control signal line.

18. The display device according to claim 17, wherein a first end of the reference capacitor is connected to a control terminal of the third transistor and is connected to the second terminal of the first transistor as a voltage input terminal of the fingerprint recognition unit; the sensing electrode is connected to the first end of the reference capacitor; and a first terminal of the third transistor is connected to the common voltage input terminal and a second terminal is connected to the first terminal of the second transistor as the output end of the fingerprint recognition unit.

19. The display device according to claim 10, wherein the respective fingerprint recognition circuits are located in non-display area of pixel units of the array substrate.

20. The display device according to claim 19, wherein the fingerprint recognition circuit is formed in a pixel unit of per X*Y pixel units, wherein X, Y≥2.

* * * * *